(12) United States Patent
Albawab

(10) Patent No.: US 12,163,353 B2
(45) Date of Patent: Dec. 10, 2024

(54) INFLATABLE TENT STORAGE ASSEMBLY

(71) Applicant: Bashar Albawab, Camarillo, CA (US)

(72) Inventor: Bashar Albawab, Camarillo, CA (US)

( * ) Notice: Subject to any disclaimer, the term of this patent is extended or adjusted under 35 U.S.C. 154(b) by 316 days.

(21) Appl. No.: 17/880,986

(22) Filed: Aug. 4, 2022

(65) Prior Publication Data
US 2024/0044167 A1 Feb. 8, 2024

(51) Int. Cl.
| | |
|---|---|
| *E04H 15/02* | (2006.01) |
| *A45C 5/14* | (2006.01) |
| *A45C 13/00* | (2006.01) |
| *A45C 13/26* | (2006.01) |
| *A45C 15/00* | (2006.01) |
| *A47C 27/08* | (2006.01) |
| *E04H 15/20* | (2006.01) |
| *E04H 15/40* | (2006.01) |
| *F04D 25/06* | (2006.01) |
| *H01M 10/46* | (2006.01) |
| *H01M 50/256* | (2021.01) |
| *H02J 7/35* | (2006.01) |
| *H02S 40/38* | (2014.01) |

(52) U.S. Cl.
CPC ............... *E04H 15/02* (2013.01); *A45C 5/14* (2013.01); *A45C 13/005* (2013.01); *A45C 13/262* (2013.01); *A45C 15/00* (2013.01); *A47C 27/082* (2013.01); *E04H 15/40* (2013.01); *F04D 25/0673* (2013.01); *H01M 10/465* (2013.01); *H01M 50/256* (2021.01); *H02J 7/35* (2013.01); *H02S 40/38* (2014.12); *A45C 2013/267* (2013.01); *E04H 2015/208* (2013.01); *H01M 2220/30* (2013.01)

(58) Field of Classification Search
CPC ..... E04H 15/20; E04H 15/208; E04H 15/206; A47C 27/082
See application file for complete search history.

(56) References Cited

U.S. PATENT DOCUMENTS

| | | | | |
|---|---|---|---|---|
| 2,297,150 | A * | 9/1942 | Hunter | E04H 15/20 52/2.21 |
| 3,393,479 | A * | 7/1968 | Slotnick | E04H 15/20 52/2.21 |
| 4,153,958 | A | 5/1979 | Paulik | |
| 4,766,918 | A * | 8/1988 | Odekirk | E04H 15/30 441/38 |
| 5,226,261 | A * | 7/1993 | Wilbourn | B60J 7/1256 52/2.21 |

(Continued)

FOREIGN PATENT DOCUMENTS

GB 2465401 5/2010

*Primary Examiner* — Noah Chandler Hawk

(57) ABSTRACT

An inflatable tent storage assembly for a tent being storable includes a box having a square shape. The box has a front wall, a back wall, a bottom wall and a top wall. The box has an interior where a tent is stored in a closed position within. The tent has a mattress being inflatable. A pump is positioned within the interior of the box and the pump fills and removes air from the mattress. In addition, a solar panel is integrated within the top wall of the box and a battery is in electric communication with the solar panel. A switch is position on the front wall of the box. The switch includes a fill position, a drain position, and an off position. A handle is positioned on the front wall of the box and a pair of wheels is positioned on the bottom wall of the box.

16 Claims, 4 Drawing Sheets

(56) References Cited

U.S. PATENT DOCUMENTS

| | | | |
|---|---|---|---|
| 6,167,898 B1* | 1/2001 | Larga | E04H 15/20 |
| | | | 135/124 |
| 6,260,306 B1* | 7/2001 | Swetish | E04H 15/20 |
| | | | 135/96 |
| D490,635 S | 6/2004 | Boso | |
| 6,951,039 B2 | 10/2005 | Roseff | |
| 7,401,370 B2 | 7/2008 | McClintock | |
| 7,444,705 B2* | 11/2008 | Chang | A47C 19/022 |
| | | | 5/904 |
| 8,001,985 B1* | 8/2011 | Conner | E04H 15/56 |
| | | | 135/96 |
| 8,176,588 B2 | 5/2012 | Lin | |
| 8,439,174 B1 | 5/2013 | Miranda | |
| 8,770,422 B2* | 7/2014 | Cantin | E04B 1/34384 |
| | | | 206/595 |
| 9,617,753 B2* | 4/2017 | Day | E04H 15/20 |
| 9,999,306 B1 | 6/2018 | Powell, III | |
| 2011/0210577 A1* | 9/2011 | Cochran | E04H 15/12 |
| | | | 135/92 |
| 2012/0037621 A1* | 2/2012 | Cantin | E04H 3/08 |
| | | | 220/4.28 |
| 2017/0058553 A1* | 3/2017 | Day | E04H 15/02 |

* cited by examiner

INFLATABLE TENT STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to inflatable furniture device and more particularly pertains to a new inflatable furniture device for a tent being storable.

(2) Description of Related Art Including Information Disclosed Under 37 CFR 1.97 and 1.98

The prior art relates to inflatable furniture devices. The prior art relates to a variety of inflatable furniture devices configured for being storable within a housing. Known prior art lacks an inflatable furniture device attached to a tent being storable within a housing and having a battery being rechargeable by a solar panel.

BRIEF SUMMARY OF THE INVENTION

An embodiment of the disclosure meets the needs presented above by generally comprising a box having a square shape. The box has a front wall, a back wall, a bottom wall and a top wall. The box has an interior defining a space for a variety of elements to be positioned within. A tent is configured for being stored in a closed position within the interior of the box. The tent has a top portion and a bottom portion wherein the bottom portion has a mattress. The mattress is configured for being inflatable. A pump is positioned within the interior of the box. The pump is configured for filling and removing air from the mattress. In addition, a solar panel is integrated within the top wall of the box. A battery is in electric communication with the solar panel, and a power port is in electric communication with the battery. A pair of charging ports and a switch are position on the front wall of the box. The switch further includes a fill position is configured for filling air within the mattress of the tent and a drain position is configured for removing air from the mattress of the tent. Moreover, an off position ceases the pump from actuating. A handle is positioned on the front wall of the box and a pair of wheels is positioned on the bottom wall of the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
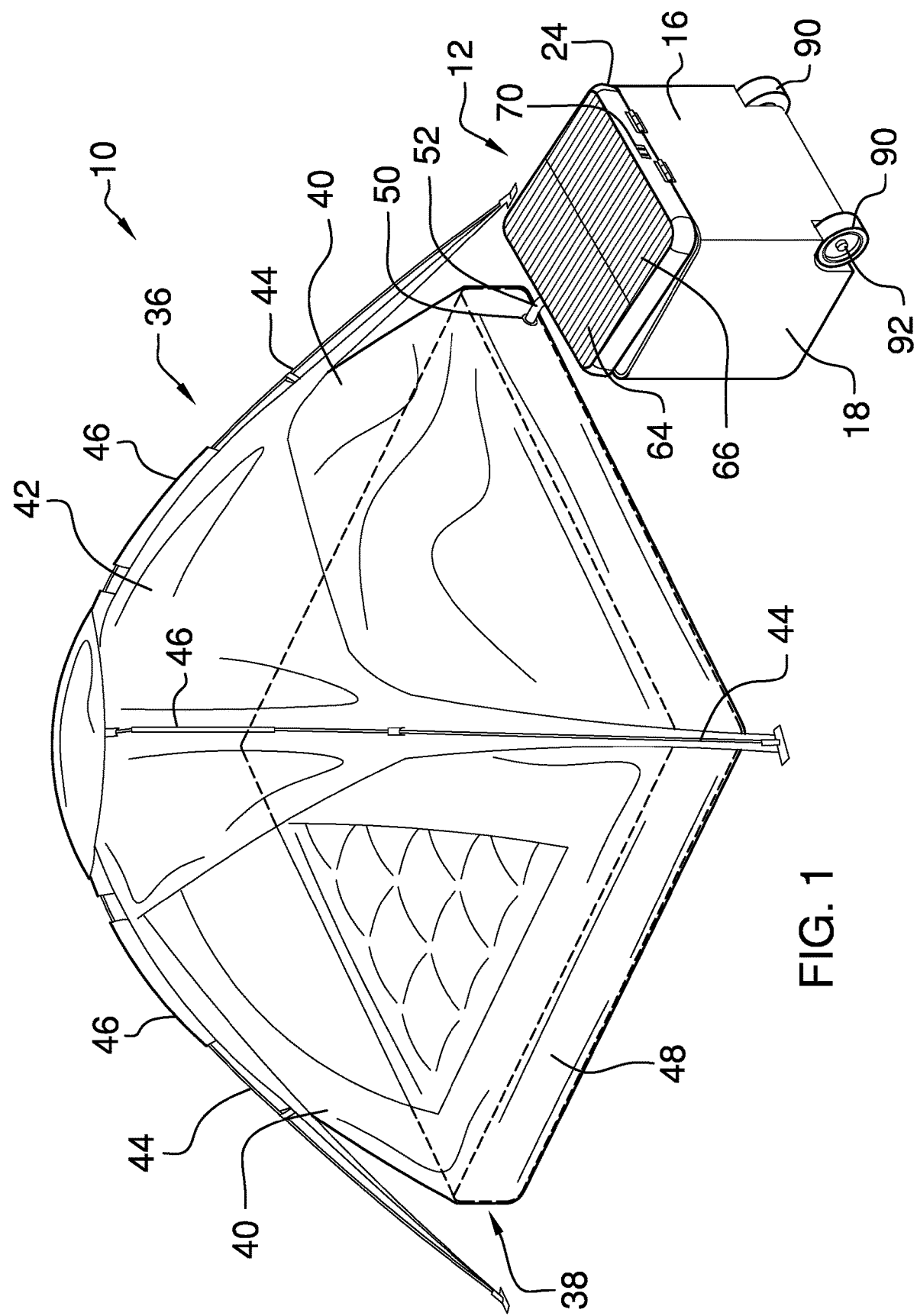
FIG. 1 is an isometric in-use view of an inflatable tent storage assembly according to an embodiment of the disclosure.
Figure 2:
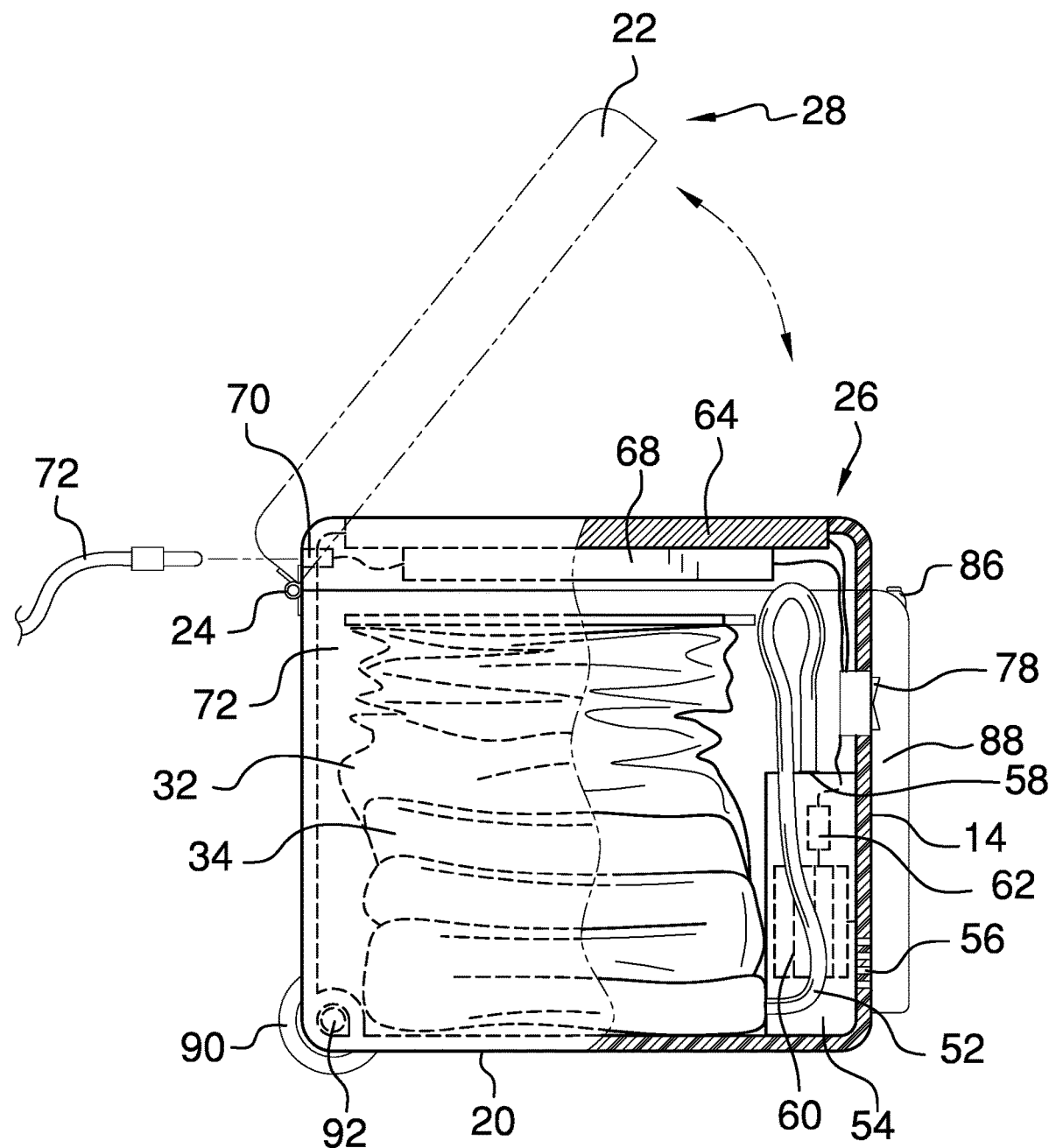
FIG. 2 is a side cross-sectional view of an embodiment of the disclosure.
Figure 3:
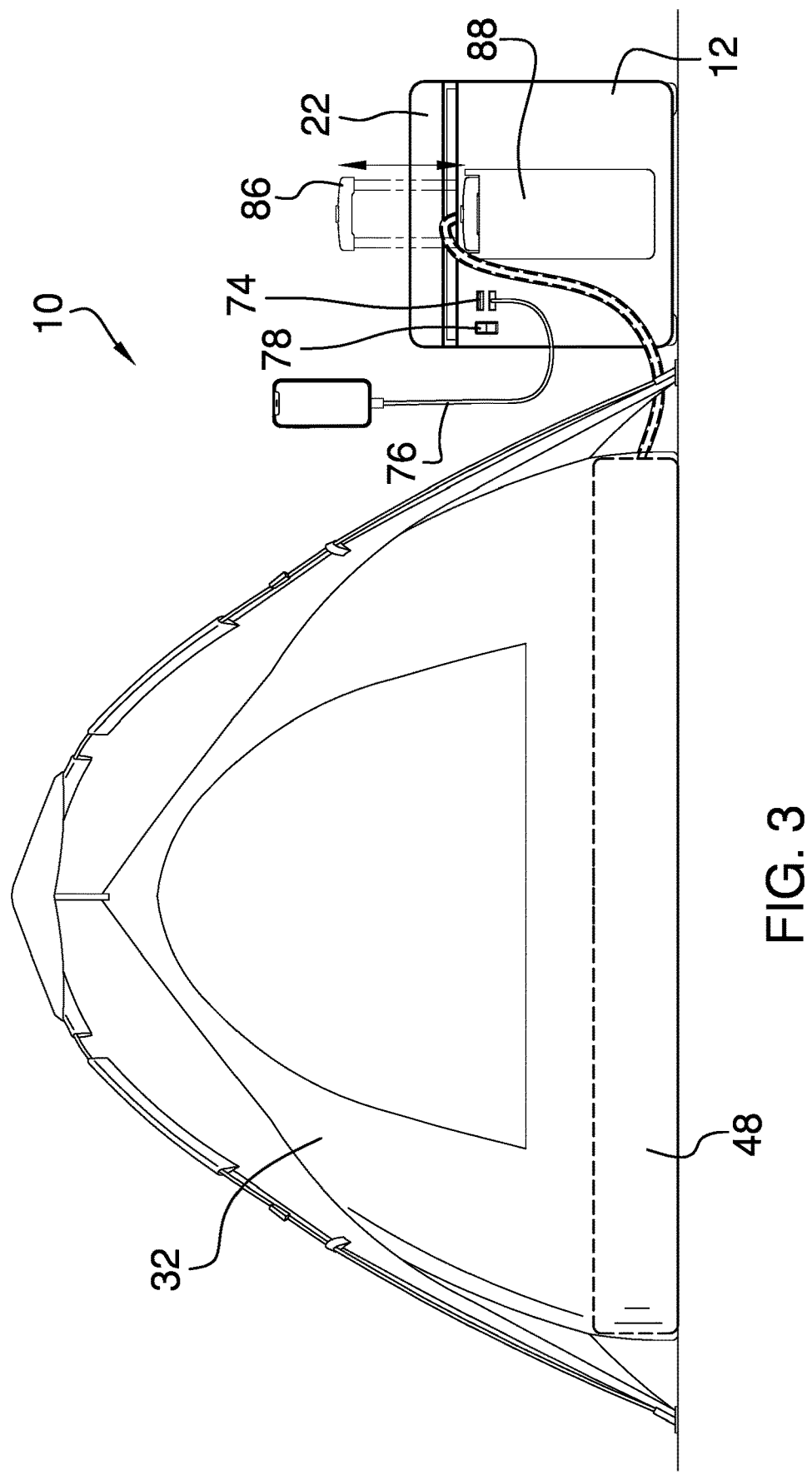
FIG. 3 is a front in-use view of an embodiment of the disclosure.
Figure 4:
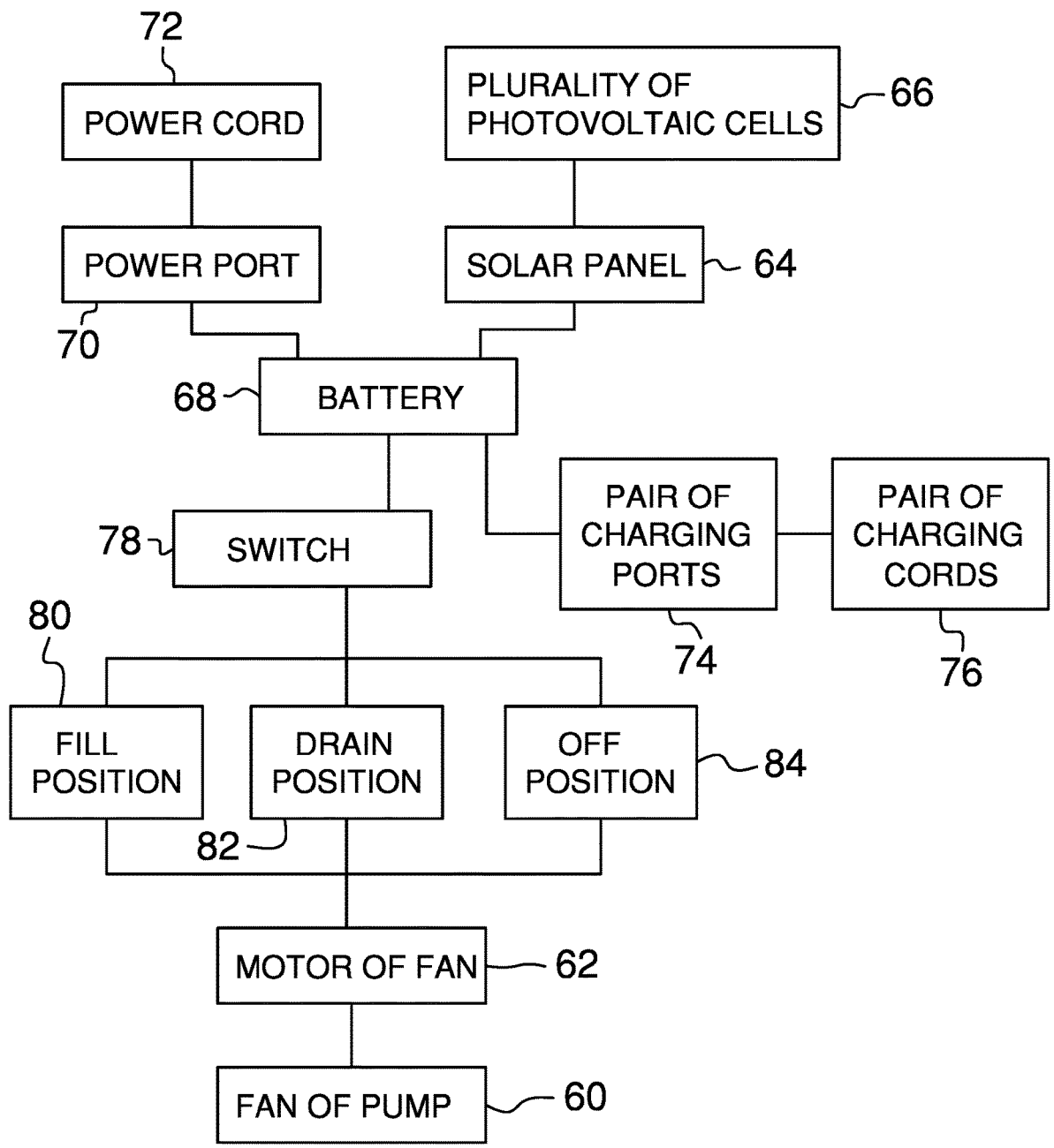
FIG. 4 is a box diagram view of an embodiment of the disclosure.

With reference now to the drawings, and in particular to FIGS. 1 through 4 thereof, a new inflatable furniture device embodying the principles and concepts of an embodiment of the disclosure and generally designated by the reference numeral 10 will be described.

As best illustrated in FIGS. 1 through 4, the inflatable tent storage assembly 10 generally comprises a box 12. The box 12 has a square shape including a front wall 14, a back wall 16, a pair of side walls 18, a bottom wall 20, and a top wall 22. The top wall 22 is coupled to the back wall 16 by a hinge 24. The hinge 24 is configured for positioning the top wall 22 from a parallel position to an angled positioned relative to the bottom wall 20 wherein positioning the top wall 22 from a shut position 26 to an open position 28. The box 12 has an interior 30 defining a space for a variety of elements to be positioned within. Furthermore, a tent 32 is configured for being stored in a closed position 34 within the interior 30 of the box 12. The tent 32 has a top portion 36 and a bottom portion 38. The top portion 36 includes a plurality of walls 40 positioned in a semi-circular shape when in an open position 42. Additionally, the top portion 36 has a plurality of posts 44 wherein each of the posts 44 is nested within a plurality of inserts 46 of each of the walls 40. Each of the posts 44 is configured for retaining the plurality of walls 40 in the open position 42. The bottom portion 38 has a mattress 48 being configured for being inflatable. The mattress 48 has a port 50 being configured for connecting to a conduit 52.

A pump 54 is positioned within the interior 30 of the box 12. The pump 54 has an inlet 56 and an outlet 58. The inlet 56 is positioned on the front wall 14 of the box 12 and the outlet 58 is coupled to the conduit 52 of the mattress 48. The inlet 56 and the outlet 58 of the pump 54 are in fluid communication with the conduit 52 of the mattress 48. The pump 54 has a fan 60 being positioned between the inlet 56 and the outlet 58 of the pump 54. The fan 60 has a motor 62 being configured for rotating the fan 60 within the pump 54 wherein the pump 54 is configured for filling and removing air from the mattress 48.

A solar panel 64 is integrated within the top wall 22 of the box 12. The solar panel 64 has a plurality of photovoltaic cells 66 being is configured for converting sunlight into electricity. In addition, a battery 68 is in electric communication with the solar panel 64. The battery 68 is configured for storing electricity and providing electric power. The battery 68 is positioned within the top wall 22 of the box 12, and a power port 70 is in electric communication with the battery 68. The power port 70 is position on the top wall 22 of the box 12 and proximate relative to the back wall 16 of the box 12. The power port 70 is configured for engaging with a power cord 72 wherein providing electricity from the power cord 72 to the battery 68.

A pair of charging ports 74 is positioned on the front wall 14 of the box 12. Each of the charging ports 74 is in electric communication with the battery 68 and is configured for providing electric power to a pair of charging cords 76. Additionally, a switch 78 is position on the front wall 14 of the box 12. The switch 78 is configured for actuating the motor 62 of the fan 60 of the pump 54 wherein engaging with the mattress 48 of the tent 32. The switch 78 is a three terminal switch further including a fill position 80, a drain position 82, and an off position 84. The fill position 80 is configured for filling air within the mattress 48 of the tent 32. The fill position 80 actuates the motor 62 of the fan 60 wherein rotating the fan 60 and flowing fluid from the inlet 56 to the outlet 58 of the pump 54 thus providing air to the conduit 52 of the mattress 48. Alternately, the drain position 82 is configured for removing air from the mattress 48 of the tent 32. The drain position 82 actuates the motor 62 of the fan 60 wherein rotating the fan 60 in an opposite direction relative to the fill position 80 and flowing fluid from the outlet 58 to the inlet 56 of the pump 54 thus removing air from the conduit 52 of the mattress 48. Moreover, an off position 84 ceases the pump 54 from actuating.

A handle 86 is positioned on the front wall 14 of the box 12. The handle 86 is housed within a container 88, and the handle 86 is configured for being expandable from the container 88. A pair of wheels 90 is positioned on the bottom wall 20 of the box 12. The pair of wheels 90 is positioned adjacent to the back wall 16 of the box 12 and each of the wheels 90 is positioned proximate to a respective one of each of the side walls 18 of the box 12. The pair of wheels 90 is coupled to the box 12 by a rotating hinge 92. Each of the wheels 90 is configured for carting the box 12 by rotating about the rotating hinge 92.

In use, the user can cart the box 12 around on the pair of wheels 90 by pulling the handle 86. The user will engage the power cord 72 with the power port 70 to provide electricity to the battery 68 of the box 12 prior to engaging with the pump 54. When the tent 32 is ready to be placed in the open position 42, the user removes the tent 32 from the interior 30 of the box 12 and places the tent 32 proximate to the box 12. The user engages with the switch 78 by positioning the switch 78 in the fill position 80 wherein providing air to the mattress 48 of the tent 32. After the mattress 48 has been filled with air, the user engages with the switch 78 by positioning the switch 78 in the off position 84 to disengage the pump 54. The user then inserts the plurality of posts 44 within the plurality of inserts 46 of the tent 32 to retain the tent 32 in the open position 42. The solar panel 64 of the box 12 will convert sunlight to electricity wherein keeping the battery 68 charged with electricity. The user can engage the pair of charging cords 76 with the pair of charging ports 74 of the box 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An inflatable tent storage assembly configured for transporting and inflating an air mattress of a tent, the inflatable tent storage assembly comprising:
    a box having a square shape, the box having a front wall and a back wall, the box having a bottom wall and a top wall, the box having an interior, the interior of the box defining a space for a variety of elements to be positioned within;
    a tent being configured for being stored in a closed position within the interior of the box, the tent having a top portion and a bottom portion, the bottom portion having a mattress, the mattress being configured for being inflatable;
    a pump being positioned within the interior of the box, the pump being configured for filling and removing air from the mattress;
    a solar panel being integrated within the top wall of the box;
    a battery being in electric communication with the solar panel;
    a power port being in electric communication with the battery;
    a pair of charging ports being positioned on the front wall of the box;
    a switch being position on the front wall of the box, the switch further including:
        a fill position being configured for filling air within the mattress of the tent;
        a drain position being configured for removing air from the mattress of the tent; and
        an off position ceasing the pump from actuating;
    a handle being positioned on the front wall of the box; and
    a pair of wheels being positioned on the bottom wall of the box.

2. The inflatable tent storage assembly of claim 1, further comprising the box having a pair of side walls.

3. The inflatable tent storage assembly of claim 1, further comprising the top wall being coupled to the back wall by a hinge, the hinge being configured for positioning the top wall from a parallel position to an angled positioned relative to the bottom wall.

4. The inflatable tent storage assembly of claim 1, further comprising the top portion including a plurality of walls positioned in a semi-circular shape when in an open position, the top portion having a plurality of posts, each of the posts being nested within a plurality of inserts of each of the walls, each of the posts being configured for retaining the plurality of walls in the open position.

5. The inflatable tent storage assembly of claim 1, further comprising the mattress having a port, the port being configured for connecting to a conduit.

6. The inflatable tent storage assembly of claim 1, further comprising the pump having an inlet and an outlet, the inlet being positioned on the front wall of the box, the outlet being coupled to the conduit of the mattress, the inlet and the outlet of the pump being in fluid communication with the conduit of the mattress, the pump having a fan, the fan of the pump being positioned between the inlet and the outlet of the pump, the fan having a motor being configured for rotating the fan within the pump.

7. The inflatable tent storage assembly of claim 1, further comprising the solar panel having a plurality of photovoltaic cells, the plurality of photovoltaic cells being configured for converting sunlight into electricity.

8. The inflatable tent storage assembly of claim 1, further comprising the battery being configured for storing electricity and providing electric power, the battery being positioned within the top wall of the box.

9. The inflatable tent storage assembly of claim 1, further comprising the power port being position on the top wall of the box, the power port being positioned proximate relative to the back wall of the box, the power port being configured for engaging with a power cord wherein providing electricity from the power cord to the battery.

10. The inflatable tent storage assembly of claim 1, further comprising each of the charging ports being in electric communication with the battery, the pair of charging ports being configured for providing electric power to a pair of charging cords.

11. The inflatable tent storage assembly of claim 1, further comprising the switch being configured for actuating the motor of the fan of the pump wherein engaging with the mattress of the tent, the switch being a three terminal switch.

12. The inflatable tent storage assembly of claim 1, further comprising the fill position actuating the motor of the fan wherein rotating the fan, the fill position being configured for flowing fluid from the inlet to the outlet of the pump wherein providing air to the conduit of the mattress.

13. The inflatable tent storage assembly of claim 1, further comprising the drain position actuating the motor of the fan wherein rotating the fan in an opposite direction relative to the fill position, the drain position being configured for flowing fluid from the outlet to the inlet of the pump wherein removing air from the conduit of the mattress.

14. The inflatable tent storage assembly of claim 1, further comprising the handle being housed within a container, the handle being configured for being expandable from the container.

15. The inflatable tent storage assembly of claim 1, further comprising the pair of wheels being positioned adjacent to the back wall of the box, each of the wheels being positioned proximate to a respective one of each of the side walls of the box, the pair of wheels being coupled to the box by a rotating hinge, each of the wheels being configured for carting the box.

16. An inflatable tent storage assembly configured for transporting and inflating an air mattress of a tent, the inflatable tent storage assembly comprising:
    a box having a square shape, the box having a front wall and a back wall, the box having a pair of side walls, the box having a bottom wall and a top wall, the top wall being coupled to the back wall by a hinge, the hinge being configured for positioning the top wall from a parallel position to an angled positioned relative to the bottom wall, the box having an interior, the interior of the box defining a space for a variety of elements to be positioned within;
    a tent being configured for being stored in a closed position within the interior of the box, the tent having a top portion and a bottom portion, the top portion including a plurality of walls positioned in a semi-circular shape when in an open position, the top portion having a plurality of posts, each of the posts being nested within a plurality of inserts of each of the walls, each of the posts being configured for retaining the plurality of walls in the open position, the bottom portion having a mattress, the mattress being configured for being inflatable, the mattress having a port, the port being configured for connecting to a conduit;
    a pump being positioned within the interior of the box, the pump having an inlet and an outlet, the inlet being positioned on the front wall of the box, the outlet being coupled to the conduit of the mattress, the inlet and the outlet of the pump being in fluid communication with the conduit of the mattress, the pump having a fan, the fan of the pump being positioned between the inlet and the outlet of the pump, the fan having a motor being configured for rotating the fan within the pump, the pump being configured for filling and removing air from the mattress;
    a solar panel being integrated within the top wall of the box, the solar panel having a plurality of photovoltaic cells, the plurality of photovoltaic cells being configured for converting sunlight into electricity;
    a battery being in electric communication with the solar panel, the battery being configured for storing electricity and providing electric power, the battery being positioned within the top wall of the box;
    a power port being in electric communication with the battery, the power port being position on the top wall of the box, the power port being positioned proximate relative to the back wall of the box, the power port being configured for engaging with a power cord wherein providing electricity from the power cord to the battery;
    a pair of charging ports being positioned on the front wall of the box, each of the charging ports being in electric communication with the battery, the pair of charging ports being configured for providing electric power to a pair of charging cords;
    a switch being position on the front wall of the box, the switch being configured for actuating the motor of the fan of the pump wherein engaging with the mattress of the tent, the switch being a three terminal switch, the switch further including:
        a fill position being configured for filling air within the mattress of the tent, the fill position actuating the motor of the fan wherein rotating the fan, the fill position being configured for flowing fluid from the inlet to the outlet of the pump wherein providing air to the conduit of the mattress;
  a drain position being configured for removing air from the mattress of the tent, the drain position actuating the motor of the fan wherein rotating the fan in an opposite direction relative to the fill position, the drain position being configured for flowing fluid from the outlet to the inlet of the pump wherein removing air from the conduit of the mattress; and
  an off position ceasing the pump from actuating;
a handle being positioned on the front wall of the box, the handle being housed within a container, the handle being configured for being expandable from the container; and
a pair of wheels being positioned on the bottom wall of the box, the pair of wheels being positioned adjacent to the back wall of the box, each of the wheels being positioned proximate to a respective one of each of the side walls of the box, the pair of wheels being coupled to the box by a rotating hinge, each of the wheels being configured for carting the box.

\* \* \* \* \*